United States Patent [19]
McGettigan et al.

[11] Patent Number: 6,086,629
[45] Date of Patent: Jul. 11, 2000

[54] METHOD FOR DESIGN IMPLEMENTATION OF ROUTING IN AN FPGA USING PLACEMENT DIRECTIVES SUCH AS LOCAL OUTPUTS AND VIRTUAL BUFFERS

[75] Inventors: Edward S. McGettigan; Jennifer T. Tran, both of San Jose; F. Erich Goetting, Cupertino, all of Calif.

[73] Assignee: Xilinx, Inc., San Jose, Calif.

[21] Appl. No.: 08/985,301

[22] Filed: Dec. 4, 1997

Related U.S. Application Data

[60] Provisional application No. 60/055,468, Aug. 12, 1997.

[51] Int. Cl.[7] ...................................................... G06F 3/00
[52] U.S. Cl. ................................. 716/12; 716/10; 716/16
[58] Field of Search ........................ 395/500.02, 500.13, 395/500.17, 500.03, 500.08, 500.09, 500.11

[56] References Cited

U.S. PATENT DOCUMENTS

| Re. 34,363 | 8/1993 | Freeman ................................... 307/465 |
| 5,113,352 | 5/1992 | Finnerty .............................. 395/500.08 |
| 5,422,833 | 6/1995 | Kelem et al. ....................... 395/500.35 |
| 5,475,830 | 12/1995 | Chen et al. .......................... 395/500.17 |
| 5,499,192 | 3/1996 | Knapp et al. ....................... 395/500.18 |
| 5,544,066 | 8/1996 | Rostoker et al. ................... 395/500.19 |

OTHER PUBLICATIONS

Ramachandran, L., Vahid, F., Narayan, S., and Gajski, D. D., "Semantics and Synthesis of Signals in Behavioral VHDL", Proceedings of the Conference on European Design Automation, Aug. 1992, pp. 616–621.

Dutt et al, "Bridging High–Level Synthesis to RTL Technology Libraries," 28th ACM/IEEE Design Automation Conference, 1991, pp. 526–529.

Rudell, "Tutorial: Design of a Logic Synthesis System," 33rd Design Automation Conference, 1996.

Alexander et al, "New Performance–Driven FPGA Routing Algorithms," 32nd ACM/IEEE Design Automation Conference, 1995.

Kim et al, "A Performance–Driven Logic Emulation System: FPGA Network Design and Performance–Driven Partitioning,"IEEE Transactions on Computer–Aided Design of Integrated Circuits and Systems, vol. 15, No. 5, pp. 560–568, May 1996.

Chowdhary et al., "Detailed Routing of Multi–Terminal Nets in FPGAs," 7th International Conference on VLSI Design, pp. 237–242, Jan. 1994.

Frankle, "Iterative and Adaptive Slack Allocation for Performance–driven Layout and FPGA Routing," 29th ACM/IEEE Design Automation Conference, pp. 536–542, 1992.

Lee et al, "A Performance and Routability Driven Router for FPGAs Considering Path Delays," 32nd ACM/IEEE Design Automation Conference, 1995.

Lin et al, "Scheduling Techniques for Variable Voltage Low Power Designs," ACM Transactions on Design Automation of Electronic Systems, vol. 2, No. 2, pp. 81–97, Apr. 1997.

*Primary Examiner*—Robert A. Weinhardt
*Assistant Examiner*—Margaret M. Joyce
*Attorney, Agent, or Firm*—Edel M. Young; Adam H. Tachner, Esq.

[57] ABSTRACT

A method of computer aided design of coarse grain FPGA's by employing a library of selected primitive cells, defining the connection classes useful in the FPGA design, and assigning appropriate connection classes to the inputs and outputs of the respective primitive cells. The primitive cells and defined interconnections used therein have accurately established timing and power parameters thereby enabling more accurate assessments of static timing and power consumption for the entire FPGA design. Moreover, the method of the present invention results in placement directives which then serve as connection criteria in carrying out subsequent place and route algorithms. One such placement directive is implemented as a "local output" (LO) of some of the primitive cells which implies that that particular output must be connected to another primitive cell input within the local configurable logic block (CLB). Another such placement directive is obtained by using a plurality of virtual buffers. They're referred to as virtual buffers because they serve only a design function and do not actually exist in a CLB. The virtual buffers provide placement directives such as to connect a primitive cell output to another CLB input within some prescribed geographical limit such as within 4 or 6 CLBs of the one in which the buffer is "located".

16 Claims, 9 Drawing Sheets

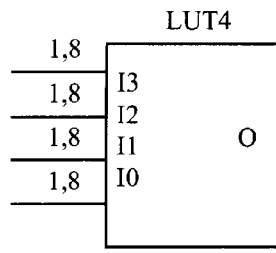
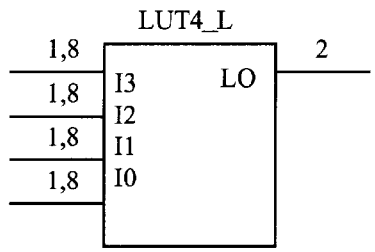
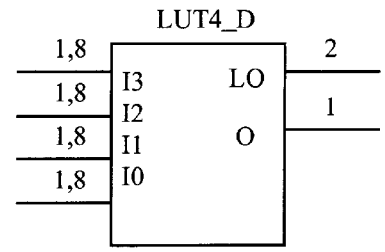
FIG. 2a          FIG. 2b          FIG. 2c
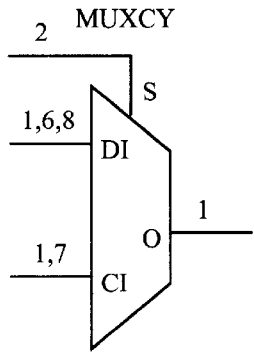
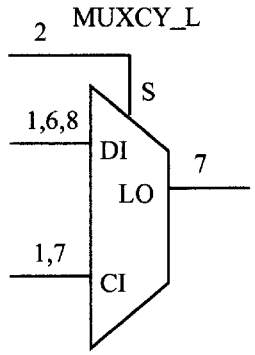
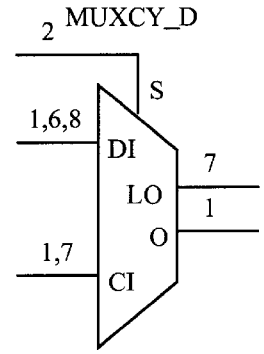
FIG. 3a          FIG. 3b          FIG. 3c
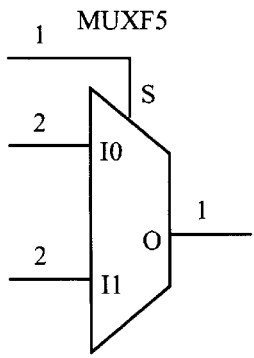
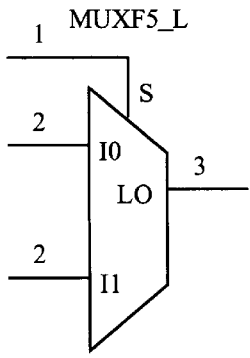
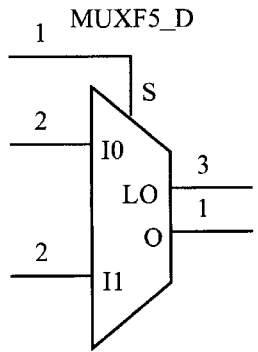
FIG. 4a          FIG. 4b          FIG. 4c

METHOD FOR DESIGN IMPLEMENTATION OF ROUTING IN AN FPGA USING PLACEMENT DIRECTIVES SUCH AS LOCAL OUTPUTS AND VIRTUAL BUFFERS

PRIORITY INFORMATION

This application claims priority of provisional application Ser. No. 60/055,468 filed Aug. 12, 1997.

RELATED PATENT APPLICATION

This application relates to the following commonly assigned pending patent applications:

1. Ser. No. 08/823,265, now U.S. Pat. No. 5,963,050 invented by Young, Camilleri, Bauer, Bapat, Chaudhary, and Krishnamurthy entitled "CONFIGURABLE LOGIC ELEMENT WITH FAST FEEDBACK PATHS" filed Mar. 24, 1997,
2. Ser. No. 08/754,421, now U.S. Pat. No. 5,889,413, invented by Trevor J. Bauer, entitled "LOOKUP TABLES WHICH DOUBLE AS SHIFT REGISTERS" filed Nov. 22, 1996,
3. Ser. No. 08/786,818, invented by Chapman and Young, entitled "CONFIGURABLE LOGIC BLOCK WITH AND GATE FOR EFFICIENT MULTIPLICATION IN FPGAS" filed Jan. 21, 1997,
4. Ser. No. 08/618,445, now U.S. Pat. No. 5,682,107 invented by Tavana, Yee and Holen entitled "FPGA ARCHITECTURE WITH REPEATABLE TILES INCLUDING ROUTING MATRICES AND LOGIC MATRICES" ontinued Mar. 19, 1996 from Ser. No. 08/222,138 filed Apr. 1, 1994, now abandonded,
5. Ser. No. 08/806,997 now U.S. Pat. No. 5,914,616 invented by Young, Chaudhary, and Bauer, entitled "FPGA REPEATABLE INTERCONNECT STRUCTURE WITH HIERARCHICAL INTERCONNECT LINES" filed Feb. 26, 1997, all of which are incorporated herein by reference.

FIELD OF THE INVENTION

The present invention relates generally to field programmable gate arrays (FPGAs) and more particularly to a method for improving static timing and dynamic power analysis of a prospective FPGA design and for passing desired placement and routing information to FPGA place and route tools.

BACKGROUND OF THE INVENTION

A typical FPGA comprises a large plurality of configurable logic blocks (CLBs) surrounded by input-output blocks and interconnectable through a routing structure. The first FPGA is described by Ross Freeman in U.S. reissue patent Re 34,363, and is incorporated herein by reference. The CLBs and routing structure of the FPGA are arranged in an array or in a plurality of sub-arrays wherein respective CLBs and associated portions of the routing structure are placed edge to edge in what is commonly referred to as a tiled arrangement. Such a tiled arrangement is described by Danesh Tavana et al. in U.S. patent application Ser. No. 08/618,445, and that application is also incorporated herein by reference. The CLB portion of a tile comprises a plurality of primitive cells which may be interconnected in a variety of ways to perform a desired logic function. For example, a CLB may comprise a plurality of lookup tables (LUTs), multiplexers and registers. As used herein, the term "primitive cell" means the lowest level of user accessible component.

When an FPGA comprises thousands of CLBs in large arrays of tiles, the task of establishing the required multitude of interconnections between primitive cells inside a CLB and between the CLBs becomes so onerous that it requires software tool implementation. Accordingly, the manufacturers of FPGAs including the assignee hereof, Xilinx, Inc., have developed place and route software tools which may be used by their customers to implement their respective designs. Place and route tools not only provide the means of implementing users' designs, but can also provide an accurate and final analysis of static timing and dynamic power consumption for an implemented design scheme. In fact, better place and route software provides iterative processes to minimize timing and power consumption as a final design implementation is approached. Iterative steps are usually necessary to reach a final design primarily because of the unknown impact of the placement step on routing resources (wires and connectors) available to interconnect the logic of a user's design. Iterative place and route procedures can be time consuming. A typical design implementation procedure can take many hours of computer time using conventional place and route software tools. Thus, there is an ongoing need to provide a method for reducing design implementation time by increasing the accuracy of static timing and dynamic power analysis during computer-aided design procedures for FPGAs.

Another challenge for software tools used to place a user's design into a coarse-grained FPGA is to make optimum use of the features other than lookup tables and registers that are available in the FPGA architecture. These can include fast carry chains, XOR gates for generating sums, multiplexers for generating five-input functions, and possibly other features available in the architecture. In order to achieve maximum density and maximum performance of user logic in an FPGA, the software must make use of these dedicated features where possible. Thus, there is also a need to densely pack the user's design into the architecture that will implement the design.

SUMMARY OF THE INVENTION

The present invention satisfies the aforementioned needs by providing a method of evaluating a customer's design for implementing in coarse grain FPGAs. Steps in the method include forming and employing a library of selected primitive library elements, defining the connection classes representative of connections in an FPGA that will implement the design, assigning appropriate connection classes to the inputs and outputs of the respective primitive library elements, and attaching timing and power parameters to each library element.

Significantly, the primitive library elements and defined interconnections used by the library elements have accurately established timing and power parameters, thereby enabling more accurate assessments of static timing and power consumption for the entire FPGA design prior to running the place and route software. Whereas the placement and routing of a user's design may take hours, the evaluation according to the present invention may take only minutes.

The library elements reflect features of the FPGA architecture. Several architectural features and associated timing and power parameters can be represented by variable parameters for one library element. For example, a lookup table library element has one variation in which the lookup table output signal is applied to a routing line external to the configurable logic block (CLB), and another variation in which the lookup table output signal is applied to another internal element of the CLB such as a five-input function multiplexer or a carry chain control input. These two variations have different timing parameters associated with them because the time delay for driving an element internal to the CLB is less than the time delay for driving an interconnect line external to the CLB.

If the FPGA user is using VHDL or schematic capture for design entry, the VHDL or schematic capture design entry tool will select the library elements, but the user must still control the design entry tool so it selects and connects the library elements properly. Alternatively, the user may design at a higher level using macros that incorporate the library elements. These macros will have been properly developed to make good use of the architectural features of the FPGA.

The method of the present invention results in placement directives for carrying out subsequent place and route algorithms. The placement directives can, for example, limit relative placement of two elements of a user's design. One such directive specifies a "local output" (LO) of some of the primitive library elements, which implies that that particular output must be connected to another primitive library element input within the local CLB.

Another kind of directive uses virtual buffer library elements to represent architectural features other than architectural elements. These library elements are referred to as virtual buffers because they serve only a design function and corresponding buffers do not actually exist in a CLB. A virtual buffer may be used to specify special dedicated routing that may exist in the FPGA interconnect architecture. For example, a fast feedback line may be represented as a virtual buffer with an associated fast timing parameter. A constraint to keep certain gates of a user's design within the same row or column may be specified by a virtual buffer. The virtual buffers can provide placement and routing directives such as to connect a primitive library element output to another CLB input within some prescribed geographical limit such as within 4 or 6 CLBs of the originating CLB.

Using local outputs (LO) and virtual buffers provides a vehicle for feeding connection constraints to place and route tools so that interconnections can be designed by the provided software tools, but within user-selected limit criteria. The primitive element library provides more accurate timing and power parameters than did prior art software tools, which in turn reduces the required number of iterations and thus the time required to complete a design.

BRIEF DESCRIPTION OF THE DRAWINGS

FIG. 1, comprising

FIG. 2, comprising FIGS. 2a, 2b, and 2c, illustrates respective input/output configurations of a four input lookup table primitive element to be used with the CLB of FIG. 1.

FIG. 3, comprising FIGS. 3a, 3b, and 3c, illustrates respective input/output configurations of a carry multiplexer primitive library element.

FIG. 4, comprising FIGS. 4a, 4b and 4c, illustrates respective input/output configurations of a function-of-five multiplexer primitive library element.

FIG. 5, comprising

FIG. 6, comprising.

FIG. 8, comprising

FIG. 9, comprising

FIG. 11, comprising

FIG. 12, comprising

FIG. 13, comprising

FIG. 14 shows additional structure associated with the CLB of FIG. 1 and illustrates the fast feedback connection implemented by element BUFCF of FIG. 13a.

DETAILED DESCRIPTION OF A PREFERRED EMBODIMENT

An FPGA includes a plurality of configurable logic blocks (CLBs) in the interior of an integrated circuit device and a plurality of input-output blocks (IOBs) at the perimeter for interfacing to external pins of the IC. A routing structure extends through the IC for interconnecting the CLBs and IOBs to each other to form a user's design. The first FPGA structure is described by Ross Freeman in U.S. Reissue Patent Re 34,363, incorporated herein by reference. Some FPGAs have a coarse grained architecture in which each CLB can provide functions of four or more input signals, and some FPGAs have a fine grained architecture in which each CLB can provide functions of two or three input signals. The present invention may be used advantageously with any coarse grain architecture FPGA to design interconnect wiring for a CLB or IOB (input-output block) implemented in that FPGA.

Figure 1A:
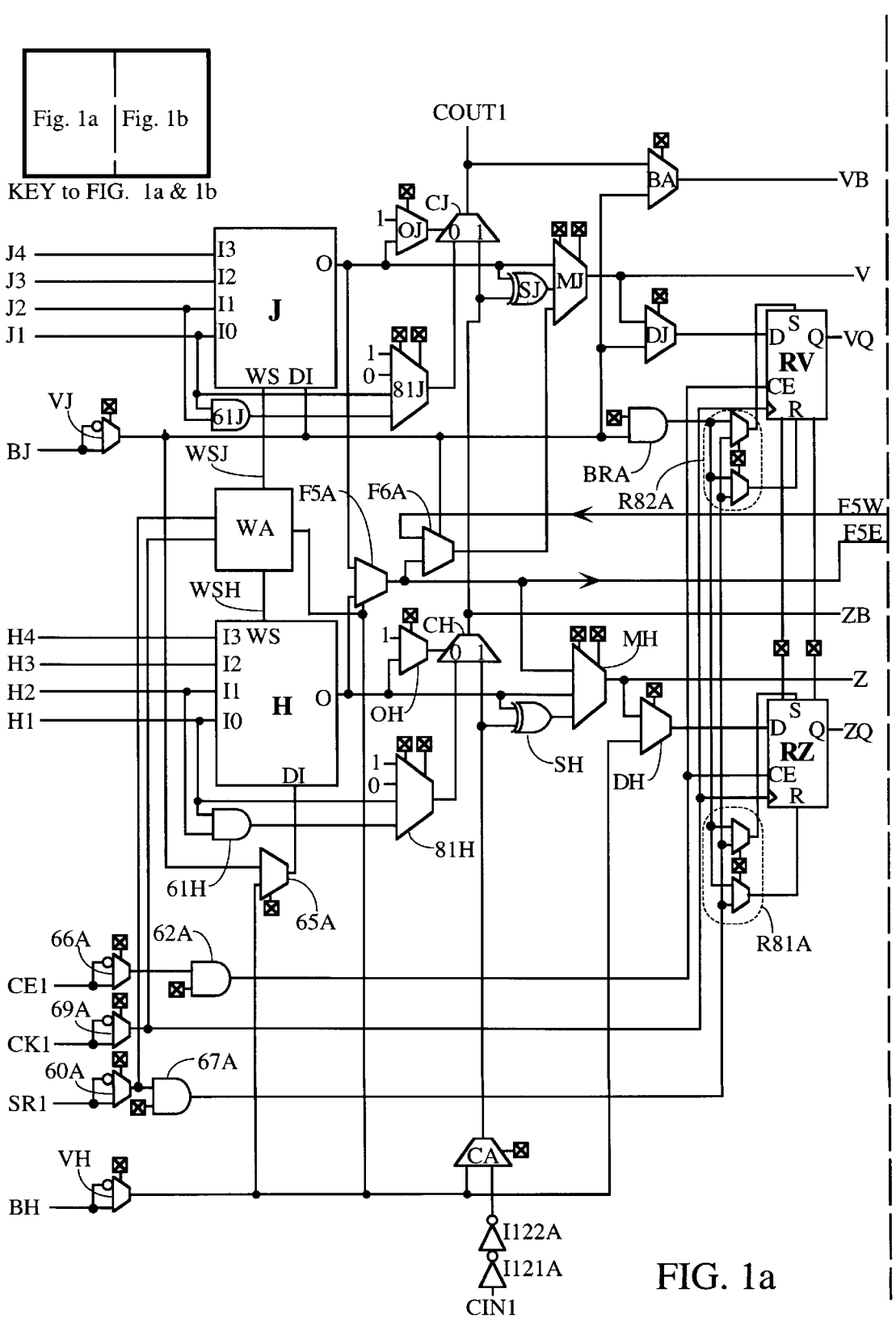
FIGS. 1a and 1b is an illustration of an FPGA CLB with which the method of the present invention may be utilized.
Figure 1B:
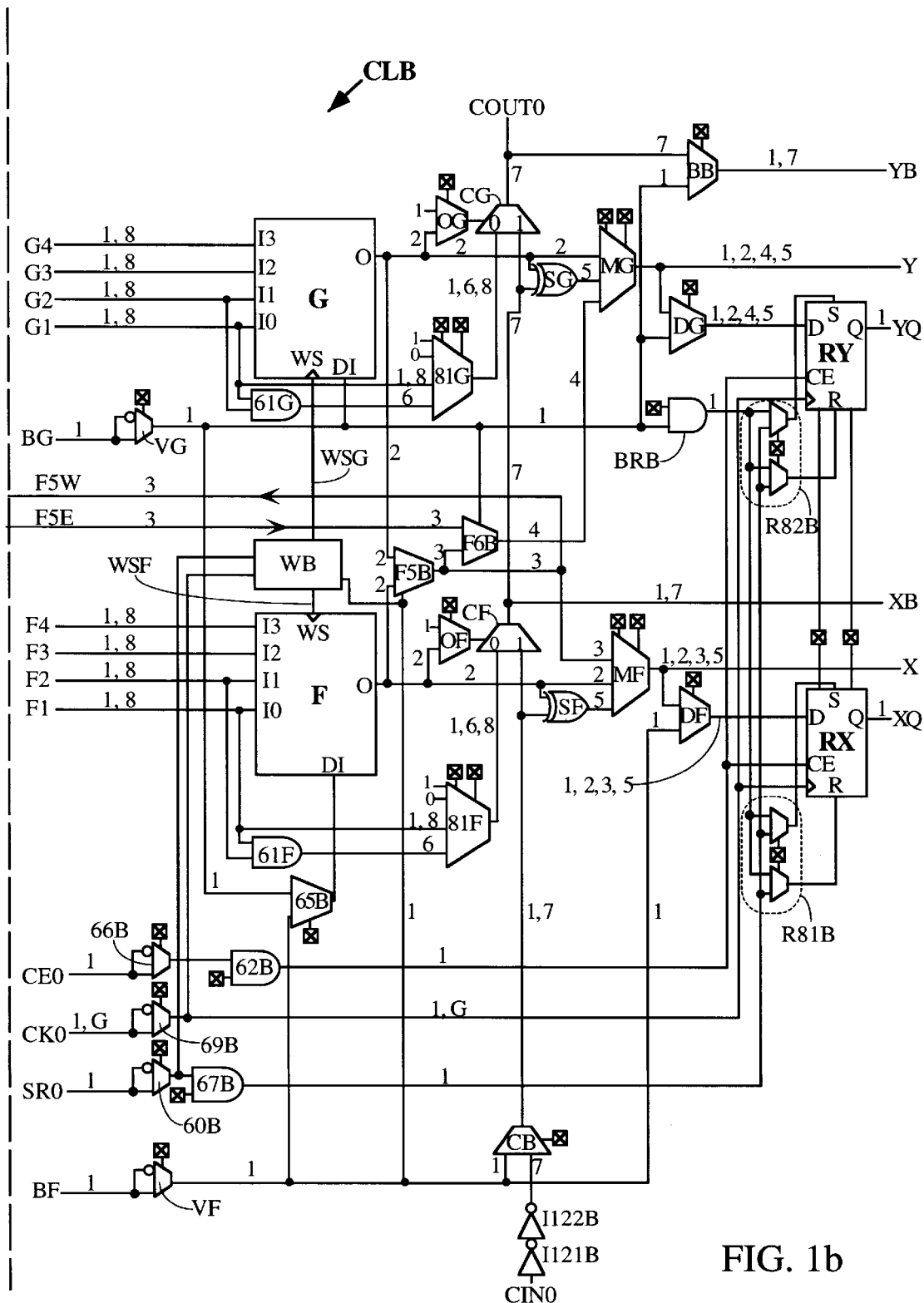

For purposes of illustrating an example of the invention, the CLB described by Young et al. in U.S. patent application Ser. No. 08/806,997 is arbitrarily selected and is shown in FIG. 1, (comprising FIGS. 1a and 1b). As seen in FIG. 1, this CLB comprises two nearly identical halves, each having two four-input lookup tables (LUTs F, G, H, J), two register elements that can be configured as D-type flip-flops or D-type latches (RX, RY, RZ, RV), two carry multiplexers that can form fast carry chains (CF, CG, CH, CJ), one function-of-five multiplexer (F5A, F5B) one function-of-six multiplexer (F6B, F6A), and two two-input XOR gates (SF, SG, SH, SJ). Additional routing multiplexers and AND gates are also provided. This CLB architecture is described more extensively in the XILINX pending patent application Ser. No. 08/823,265, entitled "CONFIGURABLE LOGIC ELEMENT WITH FAST FEEDBACK PATHS" filed Mar. 24, 1997, which is incorporated herein by reference.

According to the invention, when a new FPGA architecture becomes available, software for implementing a user's design in the new architecture is developed and includes (1) developing a library of cells associated with the new architecture, (2) defining connection classes indicating which cell outputs can connect to which cell inputs, (3) associating a connection class with each of the cell connections, and (4) associating timing and power parameters with each of the connections. These steps will now be explained.

1. Make a Library

An initial step of the present invention is the step of choosing the contents of a library of primitive library elements. As a general rule, all user accessible basic elements in the CLB (or IOB) should be in the primitive element library.

For designs implemented in the architecture of FIG. 1, such primitive library elements are shown in FIGS. 2–13. In FIGS. 2–13, the input and output ports of the library elements are designated with numerals indicating connection classes. The same numerals also appear on FIG. 1B. These numerals are discussed below after discussion of the library elements.

FIG. 2, comprising FIGS. 2a, 2b, and 2c, illustrates respective input/output configurations of a four input lookup table primitive cell in accordance with the described embodiment of the invention. The primitive cell of FIG. 2 may be selected by software or by the user to implement a four-input combinational function in the user's design, and can be implemented by the lookup tables F, G, H, and J of FIG. 1. FIGS. 2a, 2b, and 2c show three different versions of this lookup table cell.

FIG. 3, comprising FIGS. 3a, 3b, and 3c, illustrates respective input/output configurations of a carry multiplexer primitive cell. Such a cell in a user's design can be implemented by multiplexers 81F, 81G, 81H, and 81J of FIG. 1.

FIG. 4, comprising FIGS. 4a, 4b and 4c, illustrates respective input/output configurations of a function-of-five multiplexer primitive cell which can be implemented by multiplexers F5A and F5B of FIG. 1.

Figure 5A:
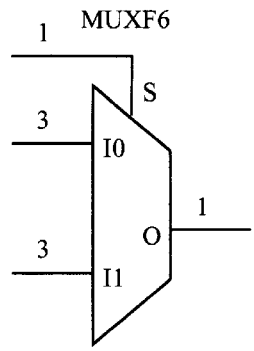
FIGS. 5a, 5b and 5c, illustrates respective input/output configurations of a function-of-six multiplexer primitive library element.
Figure 5B:
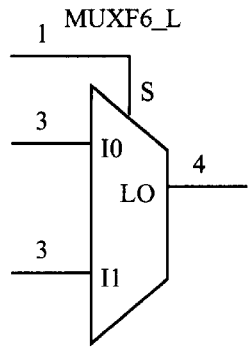
Figure 5C:
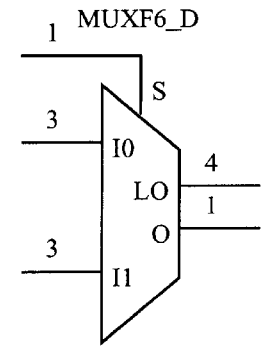

FIG. 5, comprising FIGS. 5a, 5b and 5c, illustrates respective input/output configurations of a function-of-six multiplexer primitive cell which can be implemented by multiplexers F6A and F6B of FIG. 1.

Figure 6A:
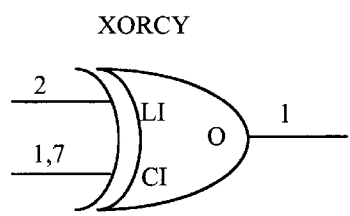
FIGS. 6a, 6b and 6c, illustrates respective input/output configurations of an XOR primitive library element.
Figure 6B:
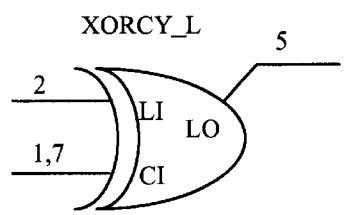
Figure 6C:
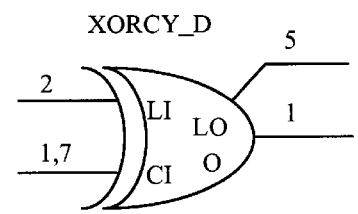

FIG. 6, comprising, FIGS. 6a, 6b and 6c, illustrates respective input/output configurations of an XOR primitive cell, which can be implemented by XOR gates SF, SG, SH, and SH of FIG. 1.

Figure 7:
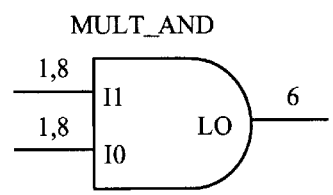
FIG. 7 illustrates a two input AND primitive library element used for multiplication circuits.

FIG. 7 illustrates a two input AND gate library element used to create multiplication circuits, which can be implemented by AND gates 61F, 61G, 61H, and 61J.

Figure 8A:
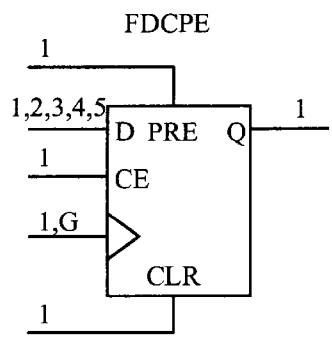
FIGS. 8a, 8b, and 8c illustrates register elements of a D-type preset/clear flip flop, a D-type latch, and a D-type set/reset flip flop.
Figure 8B:
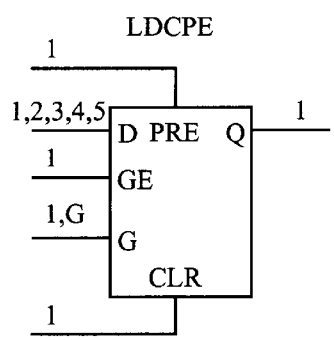
Figure 8C:
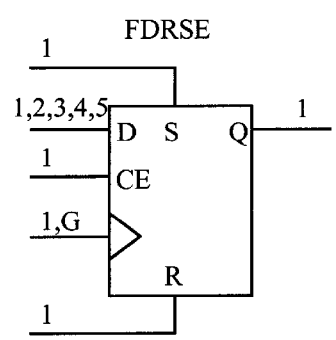
Figure 9A:
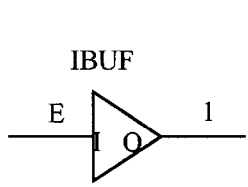
FIGS. 9a, 9b, 9c and 9d, illustrates I/O primitive library elements.
Figure 9B:
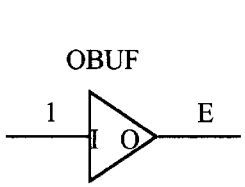
Figure 9C:
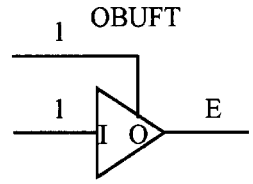
Figure 9D:
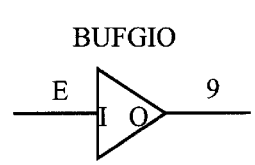

FIG. 8, comprising FIGS. 8a, 8b, and 8c illustrates register elements of a D-type preset/clear flip flop, a D-type latch, and a D-type set/reset flip flop, which can be implemented by flip flops RX, RY, RZ, and RV of FIG. 1.

FIG. 9, comprising FIGS. 9a, 9b, 9c and 9d, illustrates I/O primitive cells. These design elements can be implemented by input-output blocks not shown in FIG. 1 but present at the perimeter of an FPGA chip.

Figure 10:
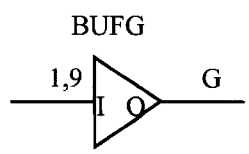
FIG. 10 illustrates a global clock buffer.

FIG. 10 illustrates a global clock buffer, which can be implemented by clock line CK1 of FIG. 1 in combination with multiplexers 69A and 69B and write strobe generators WA and WB. The global clock buffer is for indicating a dedicated global interconnect line for driving clock inputs to registers and lookup table clock control lines of the CLBs.

FIG. 11 comprising FIGS. 11a through 11i shows a lookup table RAM element. This element can be implemented by an architecture described by Trevor Bauer in U.S. patent application Ser. No. 08/754,421. The function generator lookup table can be loaded from the interconnect structure of the FPGA. The library element of FIG. 11 takes advantage of this capability.

Figure 12A:
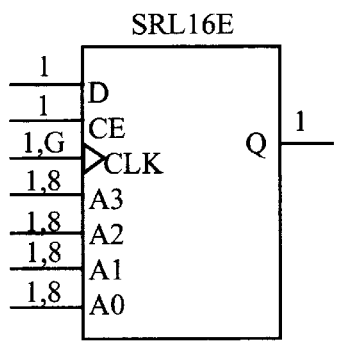
FIGS. 12a–12c illustrates a shift register element for causing the related lookup table to function as a shift register.
Figure 12B:
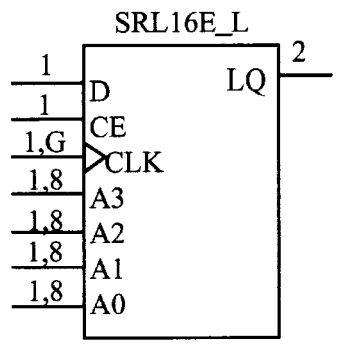
Figure 12C:
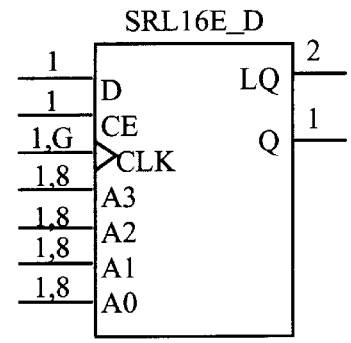

FIG. 12 comprising FIGS. 12a through 12c shows a shift register element that can also be implemented by the architecture described in the above Bauer patent application.

These primitive elements make up the basic elements of a library usable with the architecture of FIG. 1.

A number of routing multiplexers shown in FIG. 1 are treated in the library as parts of elements that provide their inputs and thus are not separately represented as library elements. For example, multiplexers MF, MG, MH, MJ, also DF, DG, DH, DJ, and 81F, 81G, 81H, 81J are not explicitly represented in the library. Other multiplexers and AND gates shown in FIG. 1 are also not represented as library elements because they are not treated as user accessible features.

In addition, a library may advantageously include elements not corresponding to physical elements in the FPGA architecture but causing the software to take advantage of various physical features of the FPGA. These additional elements are called virtual buffers and form a significant feature of the present invention. Virtual buffers are not illustrated in FIG. 1 or any other figure representing hardware of the FPGA because they do not exist in the hardware. However, the virtual buffers allow the software to take advantage of various architectural features of the hardware. For example a fast feedback path available in an FPGA of which FIG. 1 is a part is represented by a virtual buffer having associated characteristics. In an architecture having quad length lines, a virtual buffer having a label such as BUF4 can specify faster timing for connections of length less than four. For a hierarchical FPGA, a virtual buffer may be included in the library to indicate preference for connections within the same hierarchical block. Another virtual buffer may constrain certain connections to remain within a row or column.

Figure 13A:
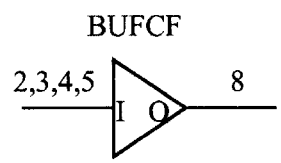
FIGS. 13a–13c, illustrates three types of virtual buffers.
Figure 13B:
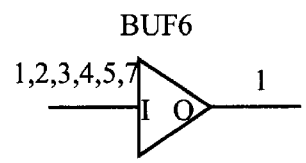
Figure 13C:
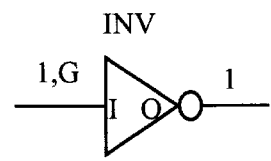

FIG. 13 illustrates three types of virtual buffers: BUFCF shown in FIG. 13a, BUF6 shown in FIG. 13b, and INV shown in FIG. 13c. A virtual buffer labeled BUFCF is used to provide a connection into the same CLB using the fast feedback interconnection that is described by Young et al. in XILINX patent application Ser. No. 08/823,265 entitled "CONFIGURABLE LOGIC ELEMENT WITH FAST FEEDBACK PATHS".

Figure 14:
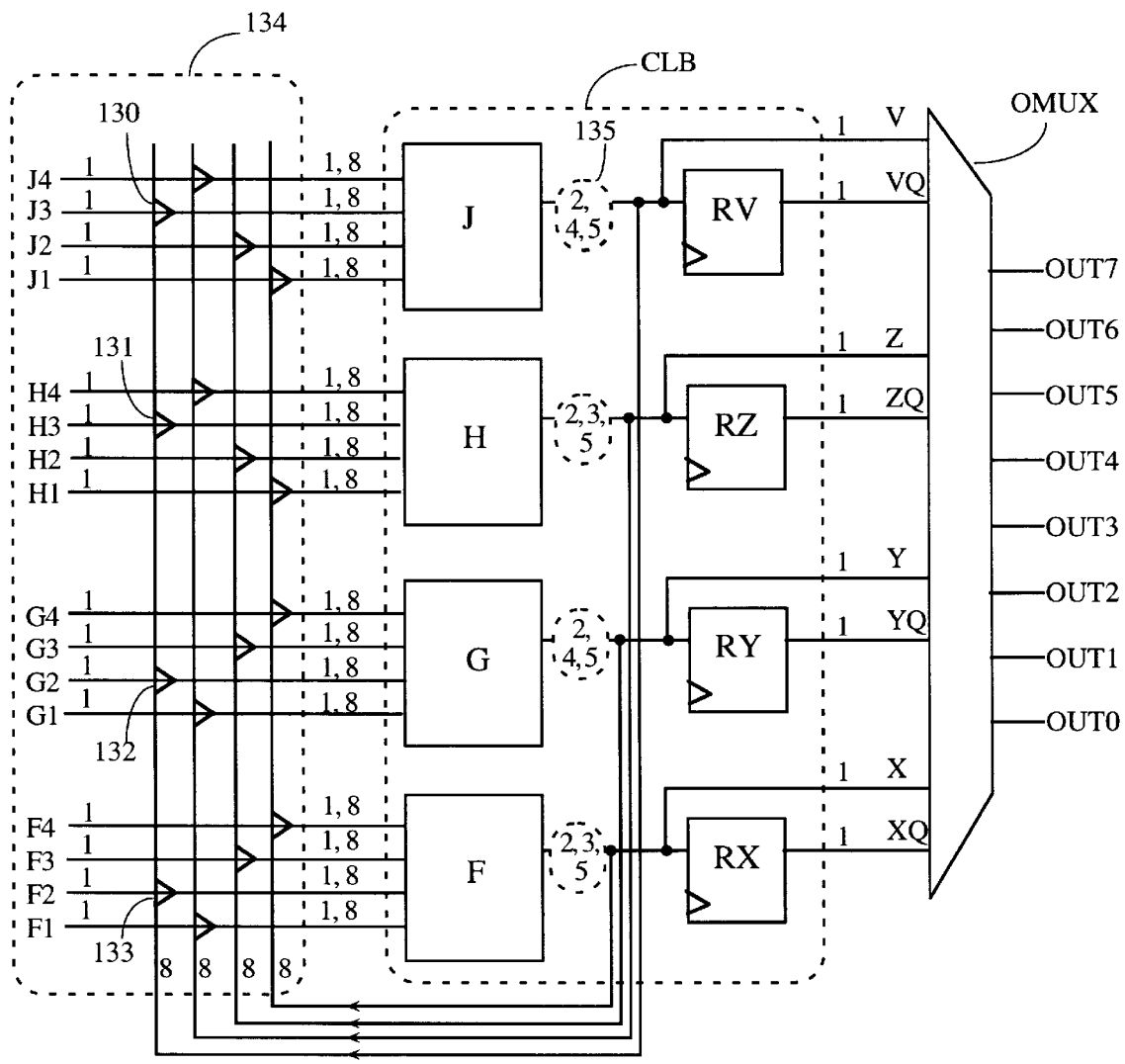

The fast feedback connection implemented by element BUFCF of FIG. 13a is shown in FIG. 14. In FIG. 14, the CLB portion shown in FIGS. 1a and 1b is labeled CLB, and only the four LUTs F, G, H, J and the four flip flops RX, RY, RZ, RV are illustrated. Dashed circles 135 represent other structures of FIGS. 1a and 1b accessed through connection classes 2, 3, 4, 5. Output lines X, Y, Z, V extend into a feedback region 134, where PIPs such as 130–133 are available to connect these lines to inputs of LUTs F, G, H, J. Specifying a virtual buffer BUFCF causes the place and route tools to select one of these fast feedback paths.

Limits beyond the local CLB may also be specified using virtual buffers. For example, a BUF1, BUF2, BUF3, BUF4, etc. library element can be used to specify a connection within 1, 2, 3, or 4, etc. CLBs of the originating CLB. The BUF6 element illustrated in FIG. 13b shows such a virtual buffer that would have a geographical limit of 6 CLBs. Thus the present invention allows the designer to specify a "geographical" limit on an interconnection without requiring a specific CLB. This leaves selection freedom to the place and route tools, but within certain selection criteria.

FIG. 13c shows an inverter element INV. In the structure of FIG. 1, the software controls optional inverter multiplexers such as 60B, 66B, and AND gates 62B, 67B to invert and enable as necessary in order to meet design requirements. In order to select the inverting choice of optional inverter multiplexers such as 60B, a user may specify the INV virtual buffer.

2. Identify Connection Classes

The next step in the process of the present invention comprises the steps of defining connection classes and architecturally permitted connections. TABLE I comprises a list of connection classes for a CLB in accordance with the disclosed embodiment.

TABLE I

| CONNECTION CLASS | DESCRIPTION |
|---|---|
| 1 | General Interconnect |
| 2 | Lookup Table local connections inside CLB |
| 3 | MUXF5 to MUXF6 connection |
| 4 | MUXF6 output to register data pin or BUFCF |
| 5 | XORCY output to register data pin or BUFCF |
| 6 | MULT_AND output to MUXCY |
| 7 | MUXCY carry to next MUXCY |
| 8 | BUFCF providing fast feedback from CLB output to LUT input |
| 9 | BUFGIO to BUFG input |
| GLOBAL | Global Clock buffer to register clock pin |
| EXTERNAL | External IO connections to IO cell |

Class 1

The general interconnect of class 1 refers to the lines and programmable interconnect points (PIPs) that form the routing structure of the FPGA for connecting one CLB to another and for connecting inputs and outputs of the FPGA to CLBs. Thus all PIPs that connect interconnect lines to each other and to other structures are in class 1. Looking at FIG. 1, all lookup table inputs F1–F4, G1–G4, H1–H4, and J1–J4 are in Class 1 as are output lines X, Y, Z, V, XB, YB, ZB, VB, XQ, YQ, ZQ, VQ. The connections of classes 2 through 8 all occur within a CLB. The lookup table local slice and CLB connections refer to the lookup table outputs that connect to other structures within the same CLB. Note on FIG. 1a or 1b that each function generator F, G, H, J has an output port O. This port can be connected through multiplexers MF, MG, MH, MJ to an output line X, Y, Z, V, which in turn is connectable to an interconnect line. In order to avoid making library elements for every routing multiplexer in the CLB, these multiplexers are not separate library elements and their time delay is added to that of the elements providing their inputs. Therefore multiplexers MF, MG, MH, MJ that connect to CLB outputs make class 1 connections and function generator outputs O that pass through these multiplexers are classified into class 1. Function generator outputs O are also able to connect to multiplexers OF, OG, OH, OJ, F5A, F5B and to XOR gates SF, SG, SH, SJ. These connections are classified as class 2 connections. It is alternatively possible to classify all function generator outputs O as class 2, and outputs of the routing multiplexers MF, MG, MH, MJ as class 1, but this requires adding library elements to represent the routing multiplexers.

Class 2

The lookup table local slice and CLB connections come from the output ports of the lookup tables and serve as input signals to other structures within the CLB slice. In FIG. 1B, lines labeled with the numeral "2" are of this class.

Class 3

Output ports of the five-input function generator multiplexers F5A and F5B are classified in connection Class 3 and are illustrated in FIG. 1B with the numeral "3". These lines are inputs to six-input multiplexers F6A and F6B, and are additionally provided to multiplexers MF and MH.

Class 4

The outputs of six-input multiplexers F6A and F6B are provided to a register data pin through routing multiplexers such as MF and DF. These connections can implement library elements in Class 4, in particular library elements shown in FIGS. 5b and 5c.

Class 5

Outputs of XOR gates SF, SG, SH, SJ are used by connections in Class 5. These outputs are provided to data registers DF, DG, DH, DJ.

Class 6

Connection of outputs of AND gates 61F, 61G, 61H, 61J, to carry chain multiplexers CF, CG, CH, CJ particularly useful in multiplication, as discussed by Chapman and Young in U.S. patent application Ser. No. 08/786,818, are accessed in connection Class 6.

Class 7

Connections in the fast carry chain of multiplexers including the chain from multiplexer CB to multiplexer CF to multiplexer CG and the chain from multiplexer CA to multiplexer CH to multiplexer CJ are classified in Class 7.

Class 8

A fast feedback connection is classified in Class 8. This connection classification is specified by using one of several virtual buffers. FIG. 14 shows another representation of the architecture of FIGS. 1a and 1b, and includes these fast feedback connections.

Class 9

The connections in Class 9 specify connections extending from the global clock pad to the global clock buffer input terminal.

Global Class G

Global clock signals can be placed onto special routing resources designed for such signals by specifying a Class G connection.

External Class E

External connections to the input-output pins are also specified in their own class.

Additional Library Rules

There may be additional connection rules represented by additional connection class constraints. By way of example, in the disclosed embodiment BUFCF can be used only to connect to the four LUTs in the same CLB. In FIG. 1, if a connection is of class 4, it must be routed to the upper register RY or RV whereas if the connection is of class 3, it must be routed to the lower register RX or RZ. If a carry input CI is of class 1, it must be routed to the lower carry multiplexer CF or CH. In addition, the use of MUXF5, MUXF6 or XORCY will curtail use of the "O" output of the associated LUTs that feed the cells and the "LO" output may not connect to the BUFCF cell. These additional rules are necessary to avoid possible illegal netlists and connections.

3. Attach Connection Classes to Library Elements

The next step of the inventive process is to attribute defined connection classes to the inputs and outputs of the primitive cells of the library. In the example discussed here, FIG. 2 shows that each LUT input is assigned classes 1 and 8. Referring to Table I, it will be seen that the inputs to the LUTs may be either a general interconnect (class 1) or a BUFCF output (class 8). As seen in FIG. 2, the outputs of LUTs may be either an "O" output assigned general interconnect classification 1 or an "LO" output assigned the classification 2 for local CLB connections (within the same CLB as the LUT), or each LUT may be provided with one of each such outputs "O" and "LO". Thus, the path through multiplexer MF, MG, MH, MJ from the function generator output to the CLB output is represented by the illustrations in FIG. 2.

As seen in FIG. 3, the inputs to carry multiplexers CF, CG, CH, CJ are classified as class 1 (general interconnect) or class 7 (MUXCY carry to next MUXCY) at input CI (corresponds to the carry chain input of FIGS. 1a and 1b); as 1, 6, 8 (see Table I) at input DI; and as 2 at the S (select) input (corresponds to the lookup table output O). The outputs "LO", "O" are classified as 7 and 1, respectively.

The function-of-five multiplexers of FIG. 4 use inputs having a classification of 2 (see TABLE I), a select signal of classification 1 and an output "LO" which has a classification of 3 or an output "O" which has a classification of 1.

The function-of-six multiplexers of FIG. 5 use inputs having a classification of 3 (see TABLE I) and a select signal and output signal having a classification of 1 (unless the output is "LO" which has a classification of 4). They can be implemented in FIG. 1 by multiplexers F6A and F6B.

As seen in FIG. 6, the inputs to the XOR gate are classified as 2 (see TABLE I) at input LI; and 1 and 7 at input CI. The outputs "LO", "O" (or both) are classified as 5 and 1, respectively. The XOR gate of FIG. 6 can be implemented in FIG. 1 by SF, SG, SH, SJ.

FIG. 7 illustrates a two input AND gate having a classification of 1 and 8 on the inputs and 6 on the output. This element can be implemented by AND gates 61F through 61J, which are intended for implementing multiplication circuits.

FIG. 8 illustrates a register storage library element that can be used to represent either a D-type preset/clear flip flop, a D-type latch, or a set/reset flip flop. The name FDCPE shown in FIG. 8a indicates a D flip flop with clear, preset, and clock enable features. The name LDCPE in FIG. 8b indicates a D latch with clear, preset and clock enable features. Similarly, the name FDRSE in FIG. 8c indicates a D flip flop with reset, set, and clock enable features. As shown therein, the D input can be connected to the output of an element classified as a 1, 2, 3, 4, or 5. In FIG. 1, this element can be implemented by registers RX, RY, RZ, and RV. Actually, in FIG. 1, register RX can be used to implement a library element connected to an output classified 1, 2, 3, or 5 and register RY can be used to implement an element connected to an output classified 1, 2, 4, or 5. All other register inputs are classified 1 (general interconnect) or 1, G (general interconnect or global), and the output is classified as a 1 (general interconnect).

FIG. 9 illustrates the library element to implement external I/O buffers, with the I input of IBUF and BUFGIO coming from an external pin in class E (external). The O output of IBUF and the I and T inputs of the OBUF and OBUFT have a classification of 1 (general interconnect) and the O output of the BUFGIO has a classification of 9 (TABLE I).

FIG. 10 illustrates a global buffer for taking an input signal from an interconnect line (class 1) or a pad (class 9) and driving the signal onto a global line (class G). Since global buffers are external to CLBs, the structure that implements the library element of FIG. 10 is not shown in FIGS. 1a or 1b.

FIGS. 11 and 12 illustrate additional library elements that can be implemented by the structure of FIGS. 1a and 1b. In FIGS. 1a and 1b, LUTs F, G, H, and J can act as 16-bit latches or RAMs with the four input signals I0 through I3 serving as address bits for selecting one of the 16 memory locations. Write strobe lines WS serve as clock lines and data-in lines DI receive input data. In addition, the structure of FIGS. 1a and 1b can implement a shift register, as described by Bauer in U.S. patent application Ser. No. 08/754,421, incorporated herein by reference.

FIG. 11 illustrates nine variations on a RAM.

Figure 11A:
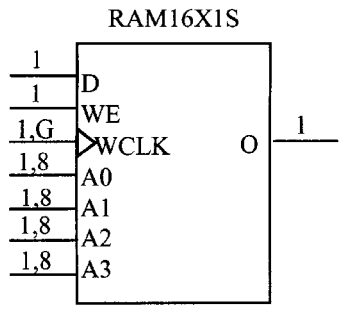
FIGS. 11a–11i illustrates a RAM select element for causing a related lookup table or tables to function as RAM.
Figure 11B:
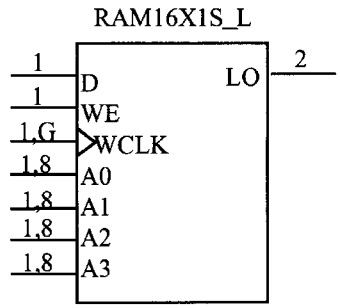
Figure 11C:
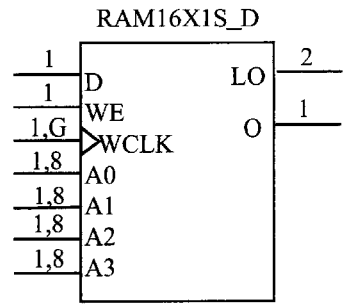

FIGS. 11a–11c illustrate 16-bit single port RAMs with outputs of either class 1 for driving an interconnect line or class 2 for driving another local element in the CLB, or both.

Figure 11D:
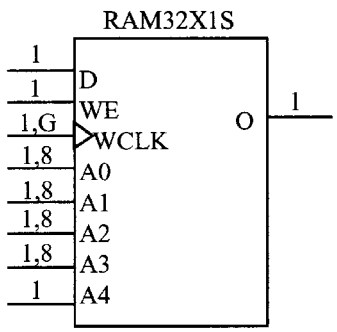
Figure 11E:
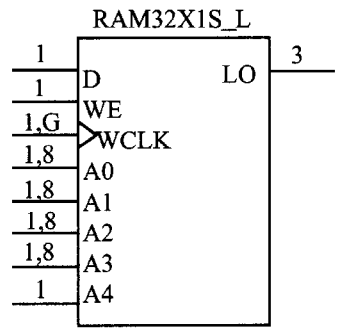
Figure 11F:
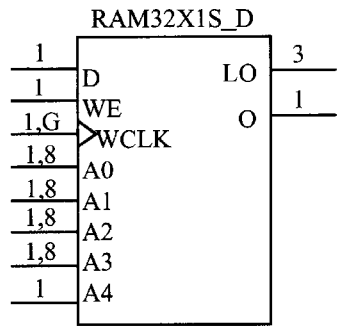

FIGS. 11d–11f illustrate 32-bit single port RAMs. A 32-bit RAM uses two 16-bit LUTs and requires five address lines. The four least significant address bits can come either from interconnect (class 1) or from fast feedback lines (class 8), as was the case for FIGS. 11a–11c. The most significant address bit, A4, comes from an interconnect line (class 1). The four least significant bits A0 through A3 are applied to two LUTs, for example both F and G in FIG. 1B and the fifth address bit A4 is applied to line BF. Note that the signal on line BF controls five-input function multiplexer F5B, and thus selects between the two LUTs F and G for reading. For writing, note that line BF also controls write strobe control circuit WB, which applies the WCLK signal only to the selected one of LUTs F and G.

Figure 11G:
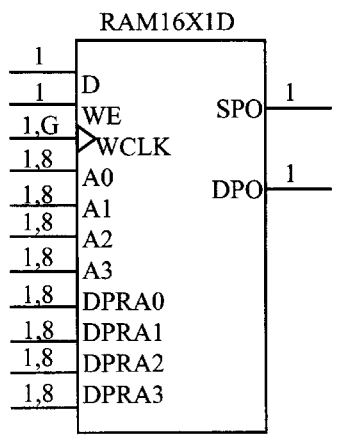
Figure 11H:
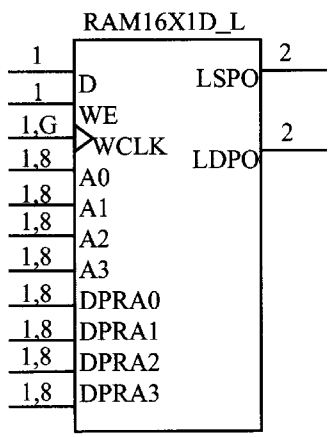
Figure 11I:
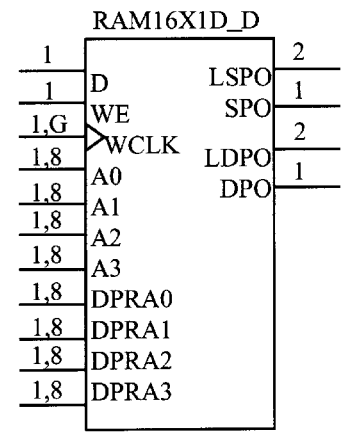

FIGS. 11g–11i show 16-bit dual port RAMs, which also use 32 bits of memory and thus require two LUTs. These library elements having additional input ports for the four dual port RAM address ports DPRA0–DPRA3. They include single and dual port output ports. FIG. 11g represents a dual port RAM for providing both a single port output SPO to an interconnect line (class 1) and a dual port output DPO to an interconnect line (also class 1). FIG. 11h shows a library element for generating two output signals to be used locally (class 2). FIG. 11i provides both local and interconnect outputs, and thus includes outputs in class 1 and class 2.

FIG. 12 illustrates a dynamically addressable shift register library element. The 16-bit shift register library element with the three variations shown in FIGS. 12a, 12b, and 12c can be implemented by the LUTs of FIGS. 1a and 1b.

In FIG. 12a, the four address bits A0 through A3 (implemented by input ports I0 through I3 of FIGS. 1a and 1b) are received from a general interconnect line (class 1) or from a fast feedback connection (class 8). The address lines determine which of the 16 registers is to be connected to the output port O, and thus determine the length of the shift register. The clock enable function CE of FIG. 12 is implemented by write enable blocks WA and WB of FIGS. 1a and 1b, and the clock enable signal is controlled by clock enable line CEO (class 1). The clock signal CLK (class 1 or class G) is implemented by the write strobe signal WS.

FIG. 12b shows the shift register having an output signal LQ for driving a local flip flop or latch (class 2). FIG. 12c shows the shift register having both a local output signal LQ (class 2) and a general interconnect output signal (class 1).

FIG. 13 illustrates three of many possible virtual buffers. Fast feedback virtual buffer BUFCF shown in FIG. 13a is used to represent a circuit element having an input signal from any of classes 2, 3, 4, or 5 and providing an output of class 8. This buffer specifies that rather than use the general interconnect (class 1) to pass a CLB output signal to an input in the same CLB, the fast feedback path is to be used to make the connection. Using virtual buffer BUFCF also issues a placement directive that the connected LUTs must be placed within the same CLB.

Placement limit virtual buffer BUF6 shown in FIG. 13b represents a signal from any of classes 1 through 7 that will be placed onto an interconnect line (class 1) but connecting to another CLB no more than 6 CLBs away from the origination CLB.

The interconnect line inverter of FIG. 13c (class 1 input and output) may be used to represent an actual inverter such as optional inverters 66B, 69B, and 60B or an inverting input to function generator F, G, H, J.

4. Define Timing and Power Parameters

The above described library is sufficiently close to the actual structure of the FPGA to permit accurate timing and power models to be created for each primitive library element. Having accurate timing and power parameters permits accurate analysis before the place and route step. The next step in the process of the present invention is to define the timing and power parameters for all of the primitive elements in the library so that the timing and power determinations for the entire user's circuit will be as accurate as possible. Timing and power models generated using the present invention are significantly more accurate than prior art netlist determinations. They can be used before placement and routing have been performed to evaluate performance and cost of a user's design, and allow a user to adjust the design accordingly.

Timing and power parameters are preferably derived from simulations or measurements of the FPGA with which the library will be used. They may also come from statistical analysis of actual designs. For one example, in the LUT of FIG. 2c, the timing arc from input pin I0 to local output pin LO (represents connections to local points in the CLB) is simply the combinational path delay through transistors in the lookup table. In FIG. 1, this represents the timing from an input such as J1 through the internal transistors of lookup table J, through the output O to the slowest of the following paths:

through multiplexer OJ to the control terminal of multiplexer CJ;

to the input of XOR gate SJ; and to the input of five-input multiplexer F5A; and corresponding paths through each of the other three lookup tables.

In the LUT of FIG. 2c, the timing arc from input pin I0 to output pin O follows a longer path and thus has a greater delay. This path goes from input pin J1 through the internal transistors of lookup table J, through the output O, through multiplexer MJ to output V.

Regarding the power parameter, in the example of lookup table J, power is consumed by switching of transistors within the lookup table, so an empirical number is associated with each port of the lookup table. Indeed, power parameters are provided for each port of each library element. Power is calculated from the formula $$P_{LUT} = V \Sigma (E_i \cdot F_i)$$

where $P_{LUT}$ is the estimated power consumed by the lookup table,

V is the operating voltage of the lookup table (and usually the entire chip), $E_i$ is the power parameter for a port of the lookup table, $F_i$ is the switching frequency for that port of the lookup table and the summation is made for all ports that are used in that instance of the lookup table. Usual units for power parameters are given in microamps per MHz. The user supplies an operating voltage and switching rate for the particular port, which are then used in the power calculation. The switching rate for a port can be specified in two ways:

1. A partial specification in which the user specifies the switching rate for some input signals of a design. The vendor tool propagates those switching rates to all nets in the design using a probabilistic algorithm that predicts the switching rate at the output of a logic element based on the switching rates and state probabilities of the input signals. (For example if a 2-input AND gate has one input that is high 50% of the time and has a switching rate of 50, and another input that is high 50% of the time and has a switching rate of 3, the output signal will have a probability of being high of 25% and a switching rate of 26.) For input signals which do not have a specified switching rate, one vendor tool assigns a default high of 50% and a switching rate of 0.5 times the clock frequency.

2. A complete specification in which the user specifies switching rates for all inputs, usually determined by simulating the design with a set of test vectors. The simulator calculates the switching rate of every net in the design using the values supplied for all input signals.

Timing and power parameters are associated with every element in the library. Timing parameters are provided for every path through each element. Power parameters are provided for every port of each element.

Wire Load Timing

An additional timing factor is also considered when calculating timing for a design implemented in an FPGA. This is the wire load timing for net delays. Table II shows wire load timing delay estimates for an example CLB output port when fanned out by different amounts.

TABLE II

| FAN OUT | DELAY |
| --- | --- |
| 1 | 1.8 ns |
| 2 | 2.4 ns |
| 3 | 3.5 ns |
| 4 | 6 ns |
| 5 | 8 ns |
| 6 | 10 ns |
| 7 | 12 ns |
| 8 | 13 ns |

These fanout delays are statistical estimates only, for use in evaluating the user's design before the user's design has actually been placed and routed. If a load to be driven by a CLB output port is eventually placed a large distance away from the CLB output port, the wire load delay for that path will be greater than the value associated with the library element (for example, as shown in TABLE II). Likewise, if a load is placed very close to the CLB output port, the delay will be less than the value associated with the library element. The delay estimates are usually within 20% of actual delays in the placed and routed design.

Wire Load Power

Estimates are made for the power consumed by the routing nets of the user's circuit, and these are also based on fanout. Since the fanout of the user's design is known before the design is placed and routed, these can be taken into account. However, since the placement and routing of the design is not known, an average power consumption based on the signal passing through an average number of routing transistors and buffers is assumed. A power table similar to Table II gives wire load power parameters as a function of fanout. Values in this table are preferably determined from doing a statistical study of actual designs. Power consumed by a net is then determined from a formula $$P_{NET} = V \cdot E_{NET} \cdot F_{NET}$$

where $P_{NET}$ is the power consumed by a net, $E_{NET}$ is the power parameter for a net of a given fanout, $F_{NET}$ is the switching frequency of the net V is the operating voltage of that net, and usually the entire chip.

To estimate power consumed by the entire user's design, the estimated power consumption values for each library element used in the user's design and power consumption values for each net used to interconnect the user's design are added. The power equation is of the form $$P_{CHIP} = P_{LIBS} + P_{NETS}$$

where $P_{CHIP}$ is estimated power consumed by the entire chip, $P_{LIBS}$ is the sum of power consumed by all library elements used in the user's design, including LUTs described in detail above and other library elements also, $P_{NETS}$ is the sum of power consumed by all nets.

EXAMPLE APPLICATION OF THE INVENTION

Figure 15:
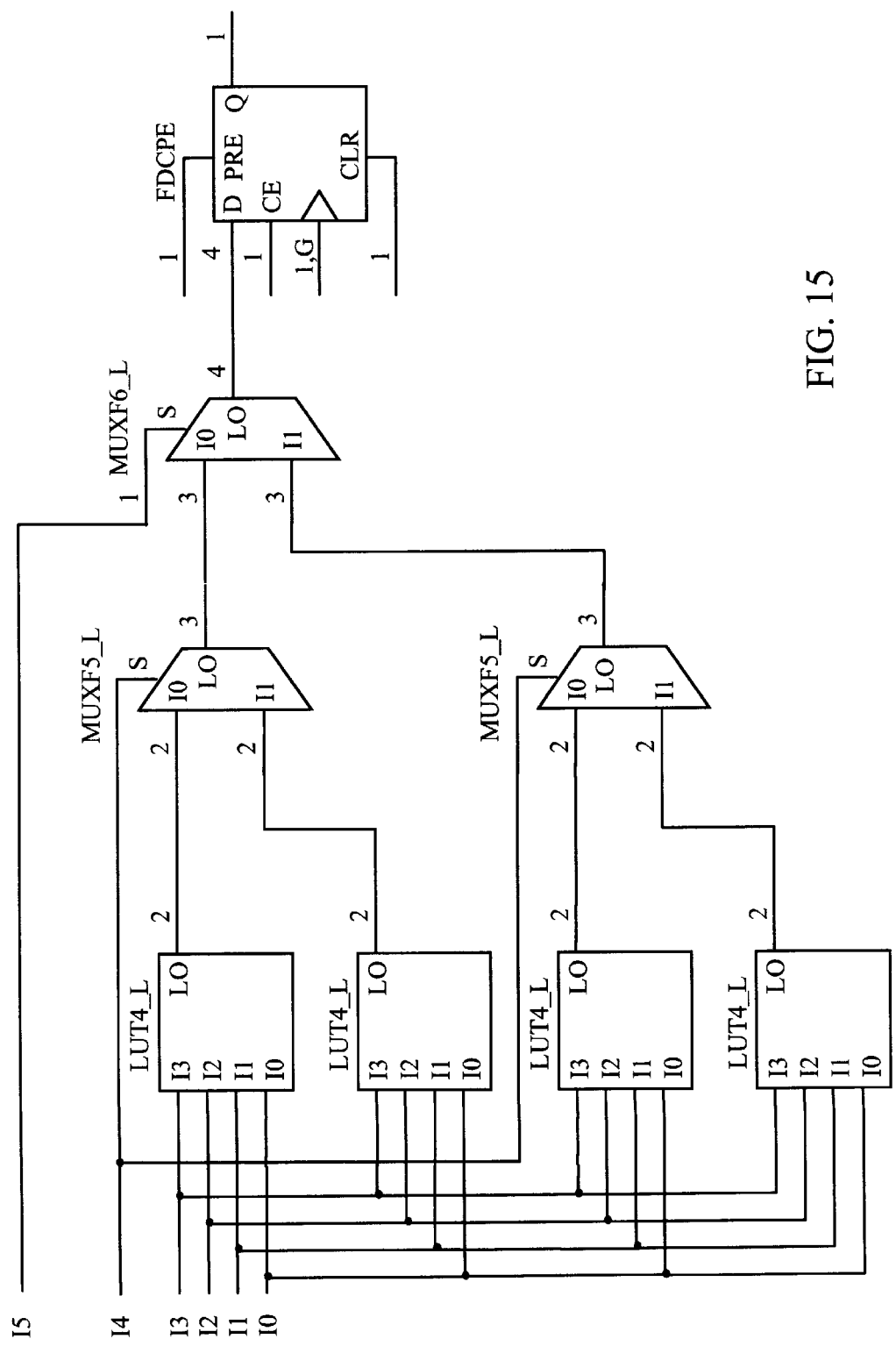
FIG. 15 is an exemplary user's design illustrating the method of the invention for generating a registered 6-input function.

FIG. 15 provides an example of CLB interconnects configured in accordance with the method of the invention disclosed herein. In the configuration of FIG. 15, the four LUTs of FIG. 1 are connected to two tiers of multiplexers to provide a function-of-six (I0 to I5) output that then connects to the D input of a D-flip flop with clock enable, preset, and clear library element. The user achieves such a design by specifying four LUT4_L library elements (FIG. 2b), two MUXF5_L library elements (FIG. 4b) and one MUXF6_L library element (FIG. 5b) and one FDCPE library element (FIG. 8a). The user specifies that two of the LUT4_L library elements are connected to one of the MUXF5_L elements and two of the LUT4_L library elements are connected to another of the MUXF5_L library elements. Since the class 2 classification on the output port the same as the class 2 classification on the data input ports I0 and I1, this is an acceptable connection. For other connections in FIG. 15, the input and output classes are also the same and are thus acceptable. Specifying such a design combination to software that operates according to the present invention allows for timing and power estimates to be made for the circuit shown in FIG. 15. A specification such as shown in FIG. 15 will cause the elements of FIG. 15 to be placed into the same CLB and will cause the final placed and routed design to take advantage of the architectural features of the structure shown in FIG. 1. Since this structure will be placed into a single CLB, its timing and power parameters will be accurately known before the user's entire design has been placed and routed. As the user specifies more circuits of the overall design, additional circuits will be indicated for placement into additional CLBs or groups of CLBs.

When the user has come to a stopping point in the design, the software can be run to determine overall timing and power numbers, and the design can be adjusted as desired by the user.

Having thus described a preferred embodiment of the invention, it being understood that the described method has many other advantageous applications in the FPGA art and is therefore not limited by the exemplary embodiment illustrated herein. For example, although several of the library elements having outputs of class 2 are shown as being connectable to several internal structures, separate library elements with separate timing parameters can be provided for each of the internal elements. And, of course, a different set of library elements will be provided for routing a user's design into a CLB having different features. In an architecture having hierarchical features, where CLBs are grouped into units having local interconnect lines, and the groups are interconnected by longer lines, virtual buffers can be provided for indicating that a connection must remain within a single grouping.

What is claimed is:

1. A method of designing interconnections in a field programmable gate array (FPGA) of the type having a plurality of configurable logic blocks, each such configurable logic block having a plurality of primitive cells, each such primitive cell having at least one input and at least one output; the method comprising the following steps:
   a) establishing a library of primitive cells;
   b) defining which primitive cell outputs may be connected to respective primitive cell inputs;
   c) defining a set of connection classes;
   d) determining which connection classes are attributed to the inputs and outputs of primitive cells in said library; and
   e) deriving timing and power parameters for the primitive cells in said library;
   wherein steps a) to e) are performed prior to placement and routing in said FPGA.

2. The method recited in claim 1 further comprising the step of:
   f) defining a virtual connection buffer designated for connecting an output of a primitive cell to an input of another primitive cell within the same logic block.

3. The method recited in claim 1 further comprising the step of:
   f) defining a virtual connection buffer designated for connecting an output of a primitive cell within one logic block to an input of another primitive cell within another logic block.

4. The method recited in claim 1 further comprising the step of:
   f) defining a virtual connection buffer designated for connecting an output of a primitive cell within one logic block to an input of another primitive cell within another logic block which is within a preselected number of logic blocks distance from said one logic block.

5. The method recited in claim 1 further comprising the step of:
   f) defining a virtual connection buffer designated for connecting an output of a primitive cell within a first logic block to an input of another primitive cell within a second logic block located within the same row or column as said first logic block.

6. The method recited in claim 1 further comprising the step of:
   f) designating some primitive cell outputs as local outputs for connection to primitive cell inputs only within the same logic block.

7. The method recited in claim 1 further comprising the step of:
   f) designating some primitive cell outputs as local outputs for connection to primitive cell inputs of virtual buffers.

8. A method of designing interconnections in a field programmable gate array (FPGA) of the type having a plurality of input/output blocks, each such input/output block having a plurality of primitive cells, each such primitive cell having at least one input and at least one output; the method comprising the following steps:
   a) establishing a library of primitive cells;
   b) defining which primitive cell outputs may be connected to respective primitive cell inputs;
   c) defining a set of connection classes;

d) determining which connection classes are attributed to the inputs and outputs of primitive cells in said library; and e) deriving timing and power parameters for the primitive cells in said library;

wherein steps a) to e) are performed prior to placement and routing in said FPGA.

9. The method recited in claim 8 further comprising the step of:

f) defining a virtual connection buffer designated for connecting an output of a primitive cell to an input of another primitive cell within the same input/output block.

10. The method recited in claim 8 further comprising the step of:

f) defining a virtual connection buffer designated for connecting an output of a primitive cell within one input/output block to an input of another primitive cell within another input/output block.

11. The method recited in claim 8 further comprising the step of:

f) defining a virtual connection buffer designated for connecting an output of a primitive cell within one input/output block to an input of another primitive cell within another input/output block which is within a preselected number of input/output blocks distance from said one input/output block.

12. The method recited in claim 8 further comprising the step of:

f) designating some primitive cell outputs as local outputs for connection to primitive cell inputs only within the same input/output block.

13. The method recited in claim 8 further comprising the step of:

f) defining a virtual connection buffer designated for connecting an output of a primitive cell within one input/output block to an input of another primitive cell within another input/output block which is within a preselected number of input/output blocks distance from said one input/output block.

14. In a field programmable gate array (FPGA) of the type having a plurality of configurable logic blocks, each such configurable logic block having a plurality of primitive cells, each such primitive cell having at least one input and at least one output, said configurable logic blocks being arranged in logic block groups, said logic blocks being interconnectable by local lines within one of said logic block groups and by long lines extending between said logic block groups; a method of evaluating a user's design for placement into said configurable logic blocks comprising the following steps:

a) establishing a library of said primitive cells, including library elements representing said primitive cells and virtual buffers representing selected ones of said lines;

b) defining which primitive cell outputs may be connected to respective primitive cell inputs;

c) defining a set of connection classes;

d) determining which connection classes are attributed to the inputs and outputs of primitive cells and virtual buffers in said library; and e) deriving timing and power parameters for the primitive cells and virtual buffers in said library;

wherein steps a) to e) are performed prior to placement and routing in said FPGA.

15. The method recited in claim 1 further comprising the step of:

f) defining a virtual connection buffer designed for providing a fast feedback path between an output and an input of a configurable logic block.

16. The method recited in claim 8 further comprising the step of:

f) defining a virtual connection buffer designed for providing a fast feedback path between an output and an input of a configurable logic block.

* * * * *